(12) United States Patent
Vik et al.

(10) Patent No.: US 9,389,714 B2
(45) Date of Patent: Jul. 12, 2016

(54) SYSTEM AND METHOD FOR FILTERING TOUCH SCREEN INPUTS

(71) Applicant: CareFusion 303, Inc., San Diego, CA (US)

(72) Inventors: Daniel Vik, La Jolla, CA (US); Gregory Borges, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 0 days.

(21) Appl. No.: 14/457,009

(22) Filed: Aug. 11, 2014

(65) Prior Publication Data

US 2014/0347307 A1 Nov. 27, 2014

Related U.S. Application Data

(63) Continuation of application No. 13/246,731, filed on Sep. 27, 2011, now Pat. No. 8,803,825.

(51) Int. Cl.
*G06F 3/041* (2006.01)

(52) U.S. Cl.
CPC .............. *G06F 3/041* (2013.01); *G06F 3/0418* (2013.01)

(58) Field of Classification Search
None
See application file for complete search history.

(56) References Cited

U.S. PATENT DOCUMENTS

2003/0095112 A1  5/2003  Kawano et al.
2011/0018828 A1  1/2011  Wu et al.

FOREIGN PATENT DOCUMENTS

EP        2315105 A1    4/2011
KR   10-2010-0018217 A  2/2010
KR   10-2010-0023326 A2 3/2010
KR   10-2010-0063769 A  6/2010

OTHER PUBLICATIONS

International Search Report and Written Opinion for PCT/US2012/056924 mailed Mar. 14, 2013.

*Primary Examiner* — Nicholas Lee
(74) *Attorney, Agent, or Firm* — McDermott Will & Emery LLP

(57) ABSTRACT

A method of filtering a touch screen input is disclosed that includes the steps of detecting a position of a first touch on a touch screen, determining a validation area that includes the position of the first touch, detecting a position for each of one or more second touches on the touch screen, and providing a touch event signal if the positions of all of the second touches are within the validation area.

37 Claims, 8 Drawing Sheets

SYSTEM AND METHOD FOR FILTERING TOUCH SCREEN INPUTS

This application is a continuation of U.S. patent application Ser. No. 13/246,731, filed Sep. 27, 2011, now issued as U.S. Pat. No. 8,803,825, entitled "System and Method for Filtering Touch Screen Inputs," the entirety of which is incorporated by reference herein.

BACKGROUND

1. Field

The present disclosure is related to a user input device that includes a touch screen and, particularly, the filtering of detected touches to reduce input errors.

2. Description of the Related Art

Modern equipment frequently includes a touch screen positioned over the visual display as one user input device. The visual display can display various screens of input features, such as buttons and sliders, and the user can interact with the displayed input features by pressing the touch screen. Touch screens can be constructed using any of a variety of technologies, for example resistive, capacitive, optical, and acoustic wave technologies. Many touch screens have an associated touch screen controller that drives the touch screen and interprets the output of the touch screen to determine the location of the point on the touch screen being touched and provide a signal to another device, such as a processor.

Hospital equipment frequently incorporates touch screens as they are fast and easy to use and are easily cleaned, compared to a keyboard. Medical devices, such as the Pyxis MedStation™, use touch screens as one of the user input devices. In these devices, patient safety may be increased by configuring the systems to reduce the possibility of errors in data entry or incorrect selection of an input feature, such as selecting an incorrect button when the user rolls their fingertip and the detected position of the fingertip on the touchscreen moves from the intended button to an adjacent button.

SUMMARY

It is desirable to filter the sensed touches of a touch screen to reduce the probability of an erroneous entry. As the determined point of contact for a relatively large contact area, for example under the fingertip of a user pressing a flat surface, sometimes moves during the contact period, it is possible that the touch-event signal sent by the touch screen processor to, for example the central processing unit (CPU) of a medical device, may not be in the location intended by the user. The present disclosure provides systems and methods of filtering the raw input from the touch screen so as to provide more reliable signals to the CPU, thereby improving patient safety.

In certain embodiments, a method of filtering a touch screen input is disclosed. The method includes the steps of detecting a position of a first touch on a touch screen, determining a validation area that includes the position of the first touch, detecting a position for each of one or more second touches on the touch screen; and providing a touch event signal if the positions of all of the second touches are within the validation area.

In certain embodiments, a non-transitory computer-readable medium having computer-executable instructions stored thereon for execution by a processor to perform a method of filtering touch screen inputs is disclosed. The method includes the steps of detecting a position of a first touch on a touch screen, determining a validation area that includes the position of the first touch, detecting a position for each of one or more second touches on the touch screen; and providing a touch event signal if the positions of all of the second touches are within the validation area.

In certain embodiments, a method of filtering touch screen inputs is disclosed. The method includes the steps of detecting a position for each of a plurality of touches on a touch screen and providing a touch event signal if the positions of all of a determined number of most recent touches are within a trigger area.

In certain embodiments, a non-transitory computer-readable medium having computer-executable instructions stored thereon for execution by a processor to perform a method of filtering touch screen inputs is disclosed. The method includes the steps of detecting a position for each of a plurality of touches on a touch screen and providing a touch event signal if the positions of all of a determined number of most recent touches are within a trigger area.

In certain embodiments, a method of filtering touch screen inputs is disclosed. The method includes the steps of starting a count-down timer with a determined period of count-down time and setting a counter to 1 and determining a validation area upon detection of a first touch, incrementing the counter upon determining that a position of another touch detected before the timer times out is within the validation area, and providing a touch-down event signal if the counter is greater than or equal to a determined number.

In certain embodiments, anon-transitory computer-readable medium having computer-executable instructions stored thereon for execution by a processor to perform a method of filtering touch screen inputs is disclosed. The method includes the steps of starting a count-down timer at a determined period of count-down time and setting a counter to 1 and determining a validation area upon detection of a first touch, incrementing the counter upon determining that a position of another touch detected before the timer times out is within the validation area, and providing a touch-down event signal if the counter is greater than or equal to a determined number.

In certain embodiments, a medical device is disclosed that includes a touch screen configured to sense a touch, a processor configured to accept a touch event signal, and a touch screen controller coupled to the touch screen and the processor. The controller is configured to detect a position of a first touch on the touch screen, determine a validation area that includes the position of the first touch, detect a position for each of one or more second touches on the touch screen, and provide a touch event signal to the processor if the positions of all of the second touches are within the validation area.

In certain embodiments, a medical device is disclosed that includes a touch screen configured to sense a touch, a processor configured to accept a touch event signal, and a touch screen controller coupled to the touch screen and the processor. The controller is configured to detect a position for each of a plurality of touches on the touch screen and provide a touch event signal to the processor if the positions of all of a determined number of most recent touches are within a trigger area.

In certain embodiments, a medical device is disclosed that includes a touch screen configured to sense a touch, a processor configured to accept a touch event signal, and a touch screen controller coupled to the touch screen and the processor. The controller is configured to start a count-down timer at a determined period of count-down time and setting a counter to 1 and determining a validation area upon detection of a first touch, increment the counter upon determining that a position of another touch detected before the timer times out is within the validation area, and provide a touch-down event signal to the processor if the counter is greater than or equal to a determined number.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The following description discloses embodiments of systems and methods for filtering the raw signals from a touch screen before providing an input signal. In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure. The systems and methods disclosed herein are discussed in the context of a touch screen that is part of a medical device in a hospital environment. Nothing herein should be interpreted to limit the coverage of the claims to a healthcare environment or to medical equipment unless specifically stated as such.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
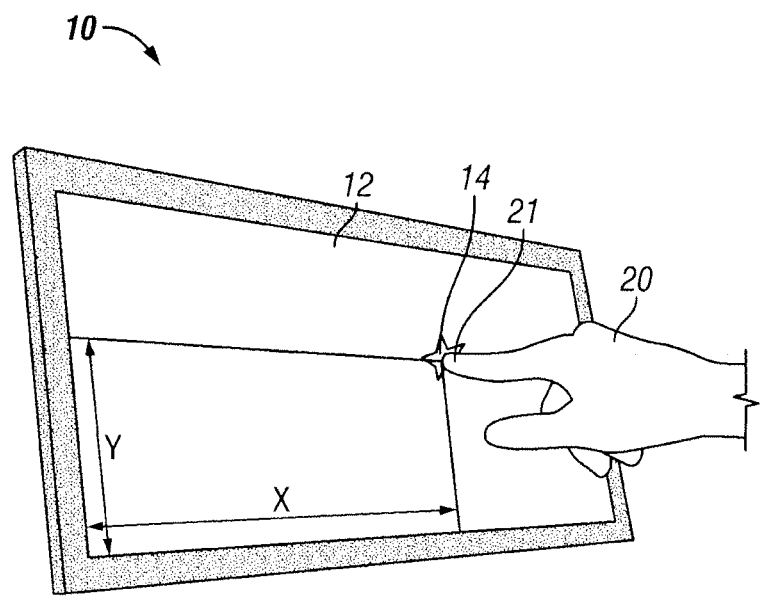
FIG. 1 depicts an exemplary display having a touch screen overlying a visual display panel according to certain aspects of this disclosure.

FIG. 1 depicts an exemplary display 10 having a touch screen 12 overlying a visual display panel (not shown), such as a liquid crystal display (LCD) according to certain aspects of this disclosure. A user 20 is touching their finger 21 to the touch screen 12 and creating a "touch" 14. The touch screen controller (not shown in FIG. 1) that is connected to the touch screen 12 determines the positions X, Y of touch 14 within the boundaries of touch screen 12. A touch screen is often used as a user input device in medical devices and other equipment such as automated dispensing machines (ADMs).

Figure 2:
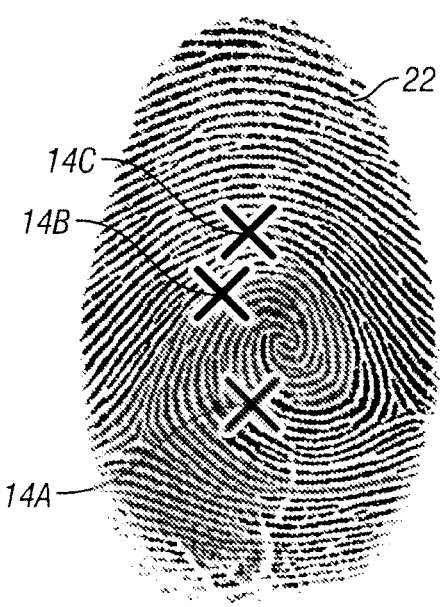
FIG. 2 is an exemplary fingerprint showing detected ouch points according to certain aspects of this disclosure.

FIG. 2 is an exemplary fingerprint 22 showing detected touch points according to certain aspects of this disclosure. A touch screen 12 does not read the pattern of the fingerprint 22 but rather senses the area of contact between the finger 21 and the touch screen 12, which corresponds to the shape of a fingerprint 22. The fingerprint 22 is initially detected to be positioned at point 14A. As the user 20 continues to press their finger 21 against the touch screen 12, the detected center of the contact area often is observed to move over time, for example to point 14B and then to point 14C, as the user 20 continues to press their finger 21 against the touch screen 12. This may be attributed to either a change in shape of the contact area between the finger 21 and the touch screen 12, which changes as the user 20 continues to apply increasing pressure to their finger 21. Alternately, the user 20 may roll their finger 21 against the touch screen 12 as the user increases the pressure applied by their finger 21 and thereby shifting the center of the contact area of fingerprint 22.

Figure 3:
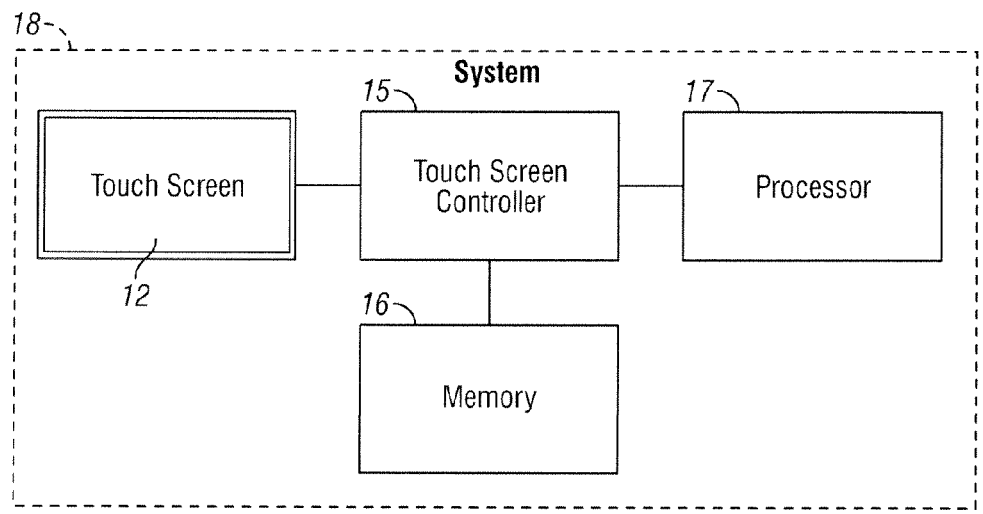
FIG. 3 is a block diagram of a system that incorporates a touch screen according to certain aspects of this disclosure.

FIG. 3 is a block diagram of a system 18 that incorporates a touch screen 12 according to certain aspects of this disclosure. The system 18 also includes a touch screen controller 15 connected to the touch screen 12, a memory 16, and a processor 17. The touch screen controller 15 includes processing capability so as to drive and detect the sensing elements of the touch screen 12, thereby determining the position of a touch 14 on the touch screen 12 as seen in FIG. 1, filtering the sensed touches, and then sends output signals to processor 17. In certain embodiments, the programming for the filtering routines is contained in memory 16.

Figure 4:
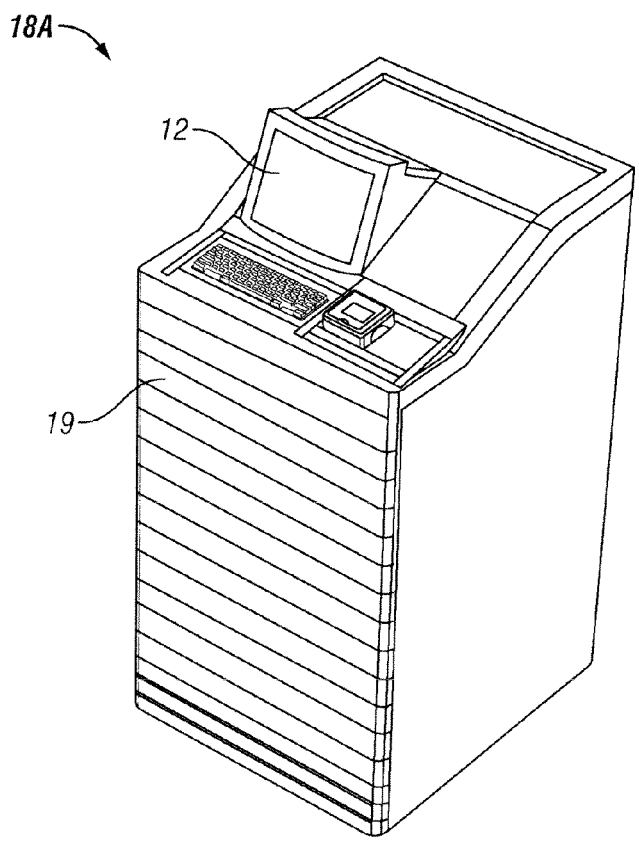
FIG. 4 depicts an ADM according to certain aspects of this disclosure.

FIG. 4 depicts an ADM 18A according to certain aspects of this disclosure. The ADM 18A includes a plurality of drawers 19 that, for example, contain medications or controlled supplies used in a hospital. The user 20 interacts with the ADM 18A through, among other interface devices, a touch screen 12 that is part of the ADM 18A. Upon entry of appropriate identification information, the user 20 gains access to the contents of the drawers 19. An ADM is merely one example of a device employing a touch screen. Other devices may include infusion devices, respiratory devices, physiological monitoring devices, etc.

Figure 5:
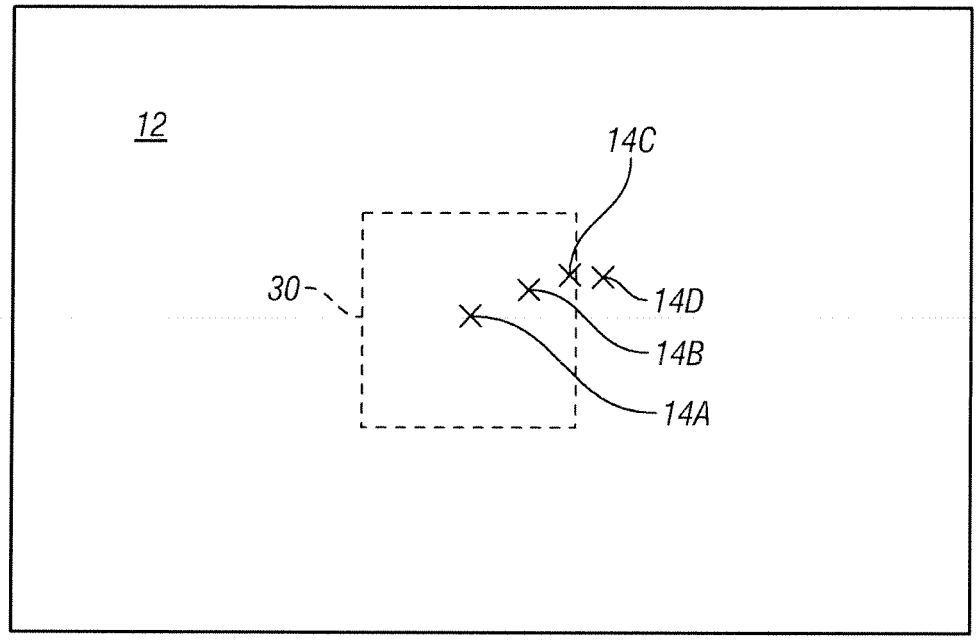
FIG. 5 is a diagram of a touch screen depicting an exemplary method of filtering of multiple touch points according to certain aspects of this disclosure.

FIG. 5 is a diagram of a touch screen 12 depicting an exemplary method of filtering of multiple touch points 14 according to certain aspects of this disclosure. The touch screen 12 initially detects a touch at point 14A. The touch screen controller 15 determines a validation area 30 around the initial touch point 14A and then determines whether subsequent touches 14B, 14C, etc. are contained within area 30. In the example of FIG. 5, touch 14B is detected to be within the area 30, as is touch 14C. Touch 14D, however, is determined to be outside area 30. In certain embodiments, when a touch event is determined to be outside of area 30, the series of touches is determined to be invalid. This method of touch validation is discussed in more detail with regard to the flowchart of FIG. 8.

Figure 6:
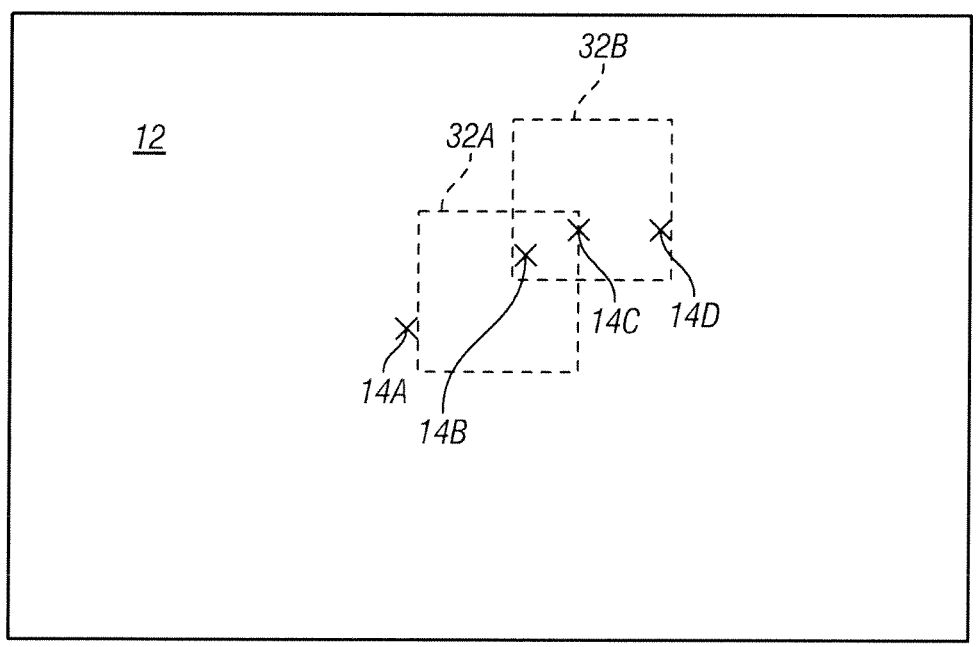
FIG. 6 is a diagram of a touch screen depicting another method of filtering multiple touch points according to certain aspects of this disclosure.

FIG. 6 is a diagram of a touch screen 12 depicting another method of filtering multiple touch points 14 according to certain aspects of this disclosure. The initial touch 14A is detected and the position noted by the touch screen controller 15. The second touch 14B is also detected and noted by the touch screen controller 15. When a third touch 14C is detected by the touch screen controller 15, the touch screen controller 15 determines whether it is possible to contain all of the most recent number, for example three, of touches 14 within a trigger area 32A. As can be seen in FIG. 6, it is not possible to contain all there of these touch events 14A, 14B, 14C within trigger area 32A. The touch screen controller 15 continues to scan for touches and upon detection of touch 14D, the touch screen controller 15 determines whether three most-recent touches 14B, 14C and 14D can be contained within the trigger area 32B. In this case, it is possible to contain all three of the most-recent sequential touches 14B, 14C, 14D within area 32B and therefore the touch series is determined to be valid. This method of touch detection filtering is discussed in greater detail with respect to the flowchart of FIG. 9.

Figure 7A:
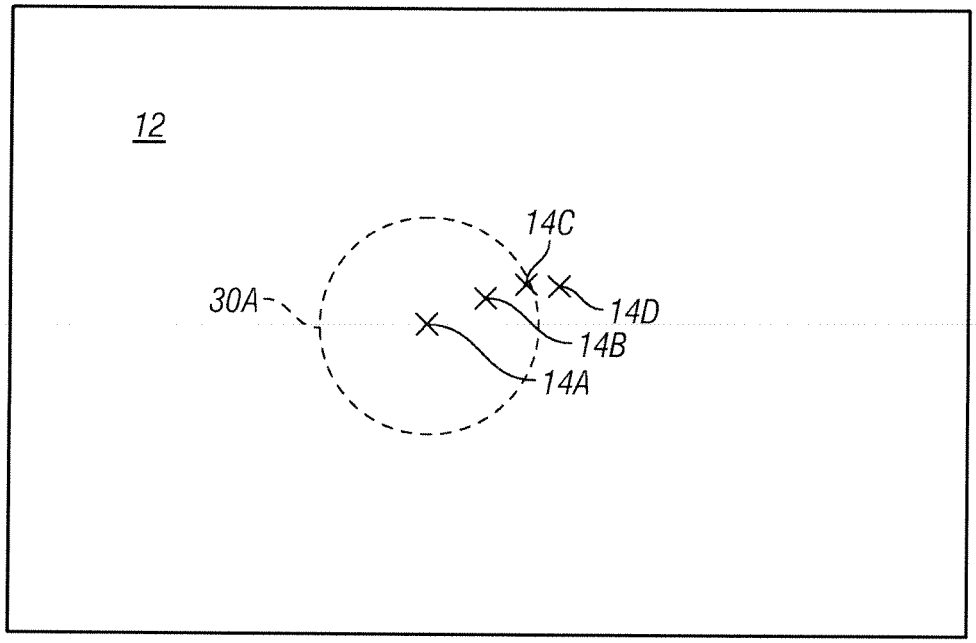
FIG. 7A is a diagram of a touch screen depicting another configuration of the validation area according to certain aspects of this disclosure.

FIG. 7A is a diagram of a touch screen 12 depicting another configuration of the validation area 30 according to certain aspects of this disclosure. In this embodiment, the validation area 30A is circular and centered about the first touch 14A. It is can be seen from FIG. 7A that touch points 14B and 14C are both within the validation area 30A, but touch point 14D is outside of the validation area 30A.

Figure 7B:
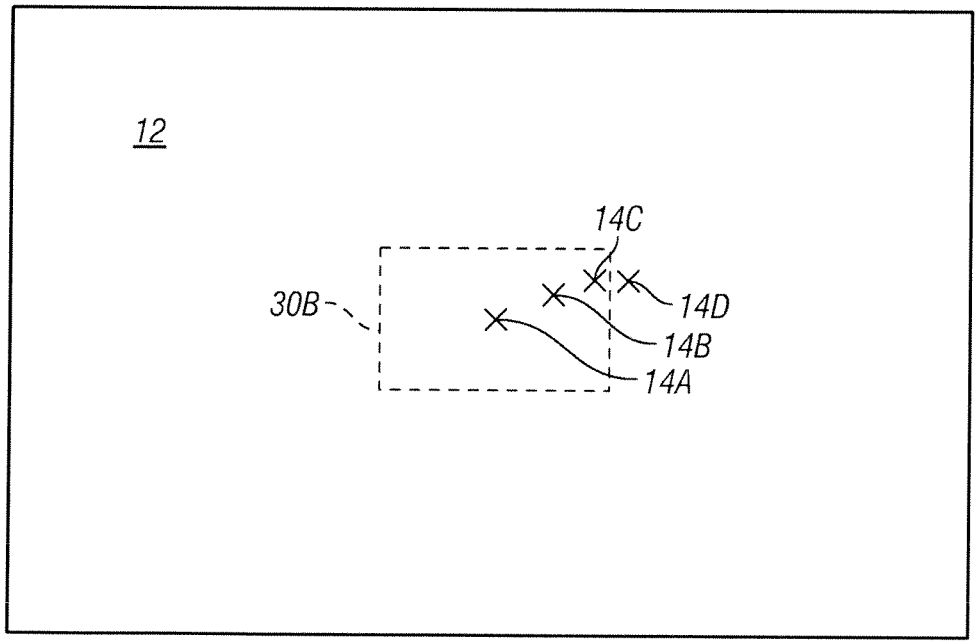
FIG. 7B is a diagram of a touch screen depicting another configuration of the validation area according to certain aspects of this disclosure.

FIG. 7B is a diagram of a touch screen 12 depicting another configuration of the validation area 30 according to certain aspects of this disclosure. In this embodiment, the validation area 30B is a rectangle centered about the initial touch point 14A. Once again, points 14B and 14C are determined to be within validation area 30B while point 14D is determined to be outside the validation area 30B and, therefore, the sequence of touches is considered invalid.

Figure 8:
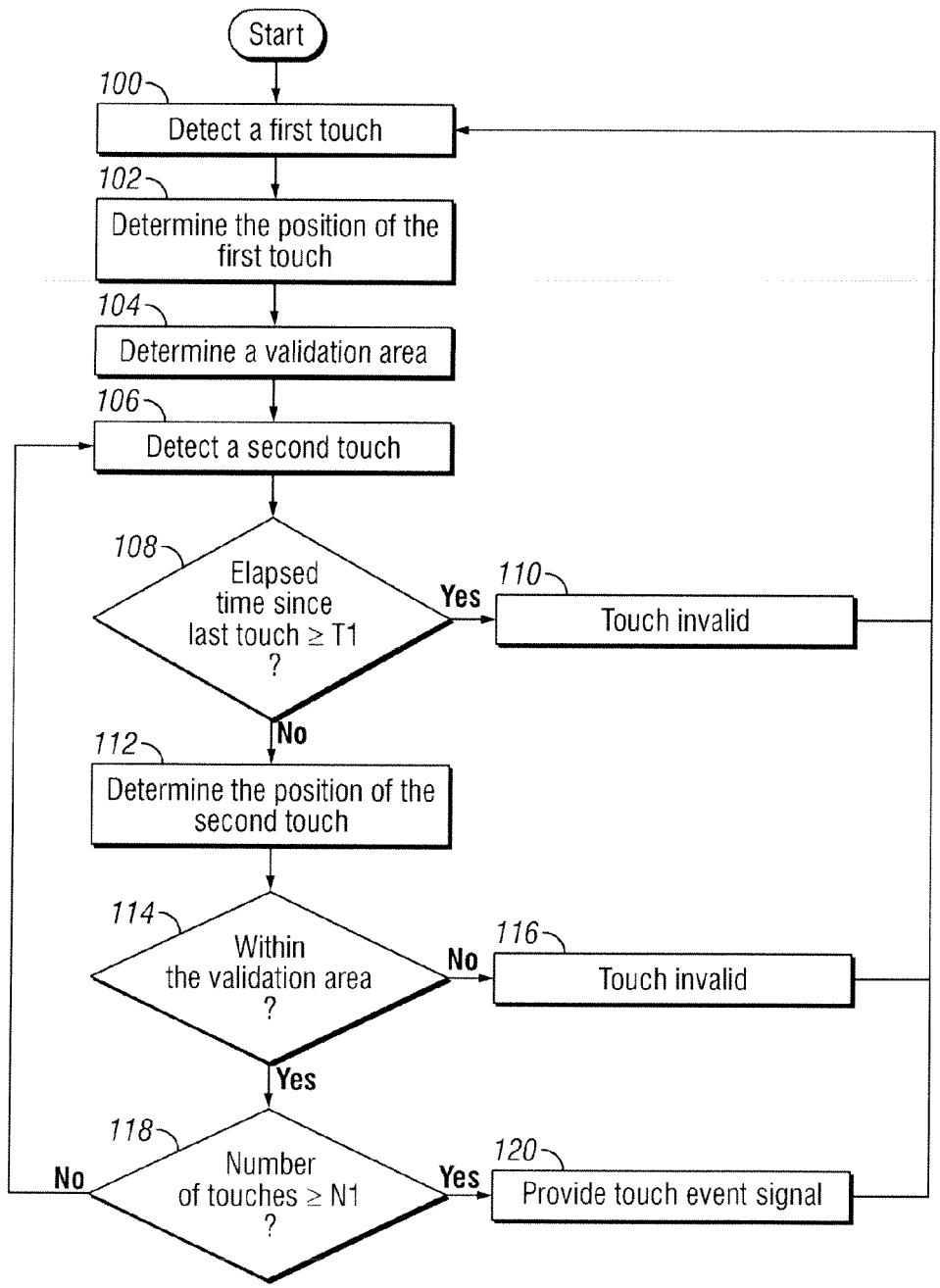
FIG. 8 is a flowchart of an exemplary touch screen filtering method according to certain aspects of this disclosure.

FIG. 8 is a flowchart of an exemplary touch screen filtering method, or process, according to certain aspects of this disclosure. The process starts at step 100 with the detection of a first touch. This leads to step 102 wherein the position of the first touch is determined. Step 104 determines the validation area, as shown in FIGS. 5, 7A, and 7B. After this validation area is determined, the system waits until a second touch is detected in step 106. The system then determines whether the time that has elapsed between the first touch and the second touch exceeds a predetermined period of time, for example T1. If time T1 is greater than or equal to a predetermined value, the process branches along the 'yes' path to step 110 which declares the touch invalid and returns back to step 100 to await another first touch. If the elapsed time is less than T1, the process branches along the 'no' path to step 112 wherein the position of the second touch is determined. The process then proceeds to step 114 and determines whether the second touch is within the validation area. If the second touch is not within the validation area, the process branches along the 'no' path to step 116 which declares the touch sequence invalid and then returns back to step 100 to await a new first touch. If the second touch is within the validation area, the process branches along the 'yes' path to step 118 wherein it is determined whether the number of valid touches has reached a predetermined number, for example N1. If the number of valid touches is greater than or equal to N1, the method branches along the 'yes' path to step 120 and the system provides a touch event signal to, for example, the processor of FIG. 3 and then returns to step 100 to await the detection of a new first touch. If the number of touches in this series is less than N1, the method branches along the 'no' path back to step 106 to await another second touch and to repeat the loop from step 106 through step 118. Within the context of FIG. 8, the phrase "second touch" is used to indicate a touch subsequent to the first touch. For example, in a series of four touches there will be one first touch and three second touches.

Figure 9:
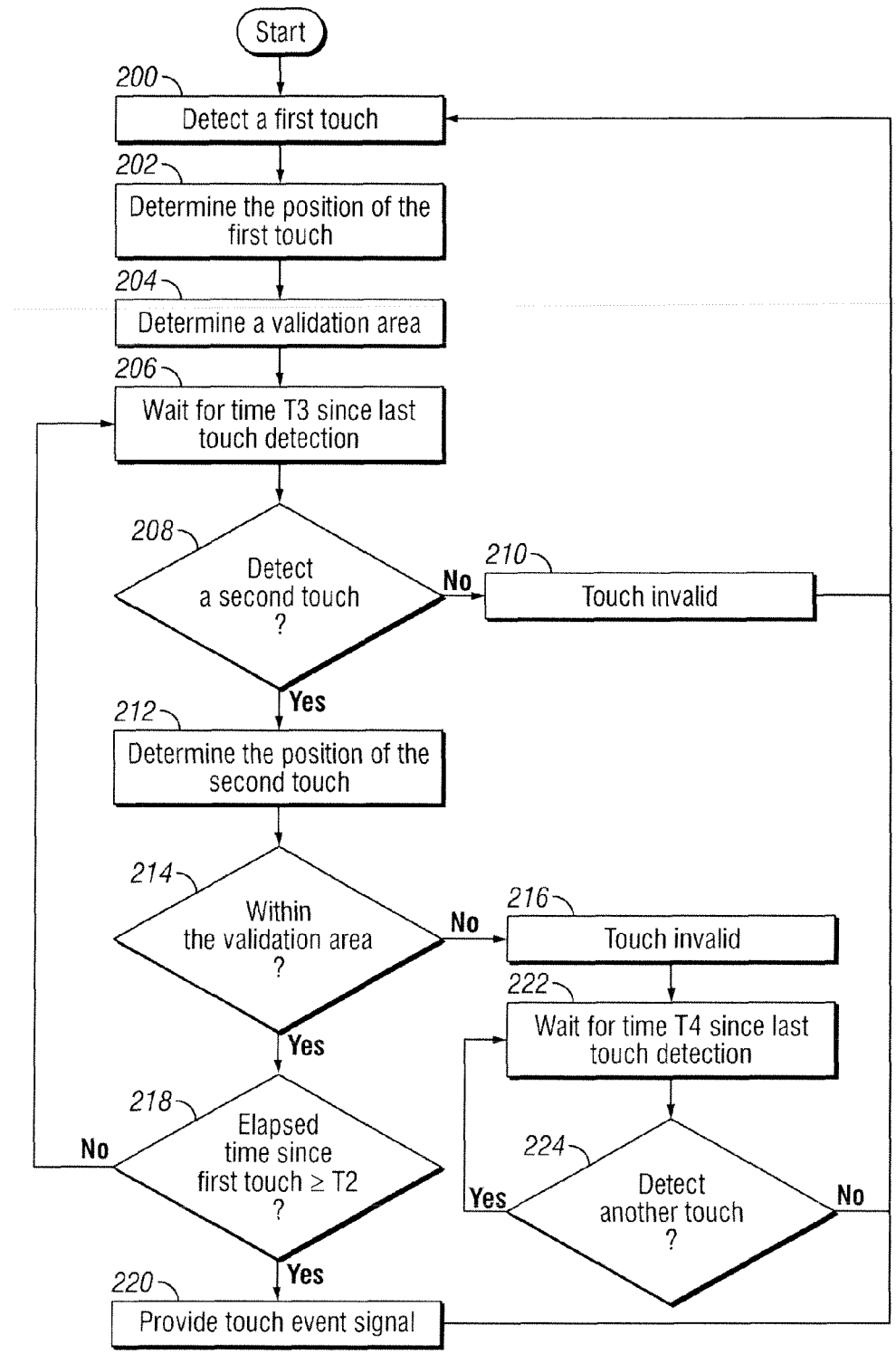
FIG. 9 is a flowchart of another embodiment of a touch screen filtering methodology according to certain aspects of this disclosure.

FIG. 9 is a flowchart of another embodiment of a touch screen filtering methodology according to certain aspects of this disclosure. In this process, the process starts at step 200 awaiting a first touch as in FIG. 8. Upon detection of a first touch, the process moves to step 202 and determines the position of the first touch, then moves to step 204 and defines a validation area related to the position of this first touch. The process then waits for a determined period of time T3 and then moves to step 208 and determines whether a second touch is present. If a second touch is not detected, the process branches along the 'no' path to step 210, declares the touch series invalid, then moving back to step 200 to await a new first touch. If the system detects a second touch at step 208, the process branches along the 'yes' path to step 212, wherein it is determined what the position of the second touch is. The process then continues on to step 214 and determines whether or not the second touch is positioned within the validation area. If the position of the second touch is not within the validation area, the process branches along the 'no' path to step 216 which declares the touch series invalid and then waits in step 222 for a determined period of time T4. If a touch is detected within time T4 at step 224, the process loops back on the 'yes' path to step 222. If no touch was detected within time T4, the process branches along the 'no' path and returns to step 200 to await a new first touch. If the second touch is within the validation area, the process branches along the 'yes' path to step 218 which determines whether or not the time that elapsed between the first touch and the most-recent touch is greater than or equal to a predetermined elapsed time, for example T2. If the elapsed time has reached T2, the system moves along the 'yes' path to step 220 and provides a touch event signal, for example to the processor 17 of FIG. 3, and then returns back to step 200 to await a new first touch. If the elapsed time since the first touch has not reached T2, the process branches along the 'no' path back to step 206 and waits for a new period of time T3 since the previous second touch before proceeding on through the loop of step 206 to step 218 again. The system will loop through steps 206 through 218 until the elapsed time from the first touch detected in step 200 has met or exceeded time T2.

Figure 10:
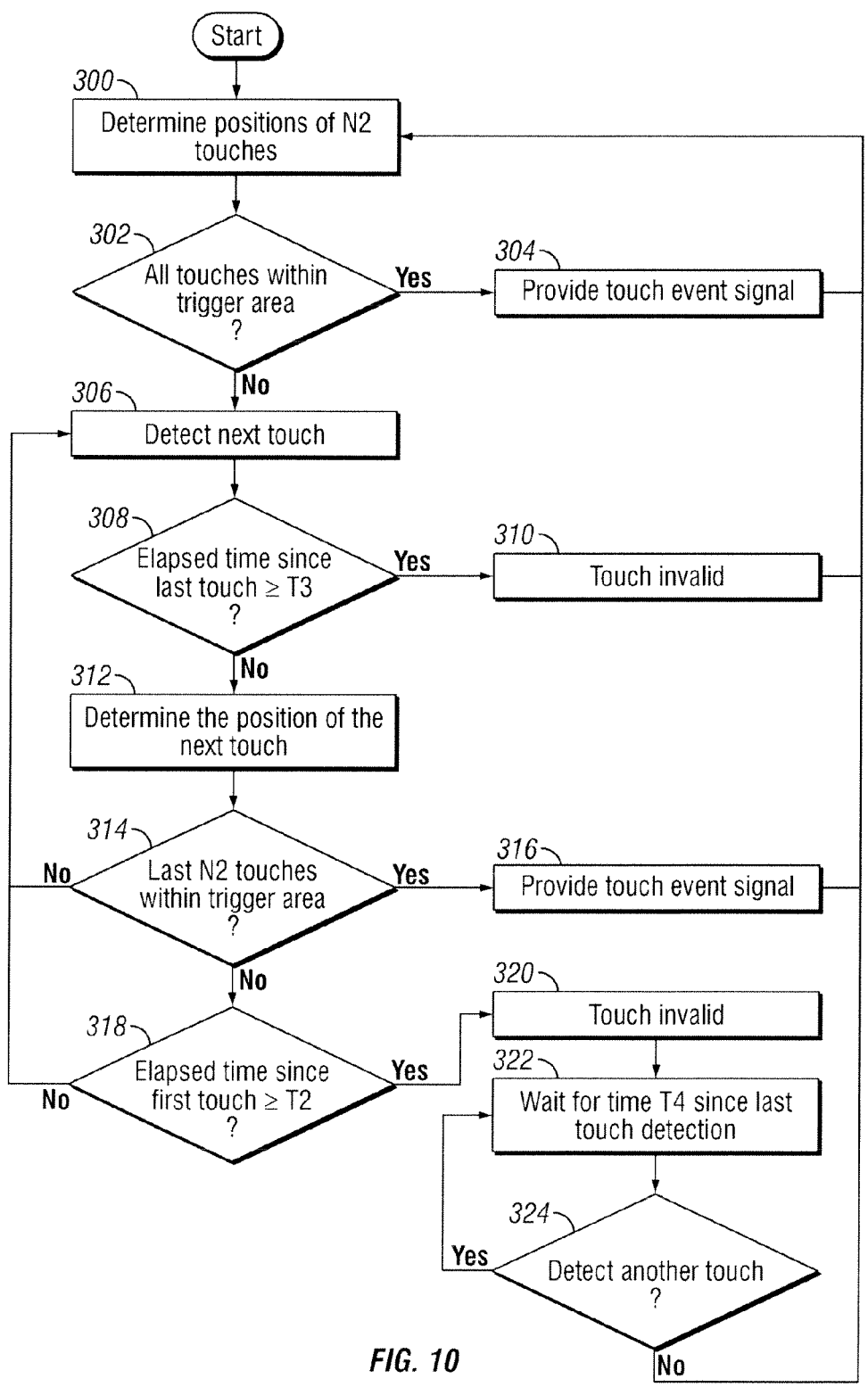
FIG. 10 is a flowchart depicting another touch screen filtering method according to certain aspects of this disclosure.

FIG. 10 is a flowchart depicting another touch screen filtering method according to certain aspects of this disclosure. This process starts at step 300 wherein the system determines the positions of a number, for example N2, of detected touches of a touch screen. After detecting a set of N2 touches, the process moves to step 302 and determines whether all of the N2 touches are within a trigger area, such as shown in FIG. 6. If all N2 touches are within the trigger area, the process branches along the 'yes' path to step 304 providing a touch event signal and then returns to step 300 to await a new series of touches. If all of the N2 touches are not within the trigger area, the process branches along the 'no' path to step 306 and awaits the detection of a next touch. Upon detection of a next touch, the process moves to step 308 to determine whether or not the elapsed time between the last of the initial N2 touches and the next touch equals or exceeds a determined amount of time, for example T3. If the elapsed time is greater than or equal to T3, the process branches along the 'yes' path to step 310 and declares the touch series invalid, then moves to the step 300 to await a new series of N2 touches. If the elapsed time is less than T3, the method branches from step 308 along the 'no' path to step 312 and determines the position of the next touch that was detected in step 306. The process then proceeds to determine whether the last N2 number of touches, i.e. the next touch detected in step 306 and the last N2-1 touches of the previous set of touches, are within the trigger area. If the last N2 number of touches are within the trigger area, the process branches along the 'yes' path to step 316 and provides a touch event signal, for example to the processor 17 of FIG. 3, then moves to step 300 to await a new series of N2 touches. If the last N2 number of touches are not within the trigger area, the process branches along the 'no' path to step 318 and determines whether the elapsed time since the first touch has exceeded a determined period of time, for example T2 similar to the method of FIG. 9. If the total elapsed time is greater than or equal to T2, the process branches along the 'yes' path to step 320 and declares the touch series invalid, then waits in step 322 for a determined period of time T4. If a touch is detected within time T4 at step 324, the process loops back on the 'yes' path to step 322. If no touch was detected within time T4, the process branches along the 'no' path and moves to step 300 to await a new series of N2 touches. If the elapsed time since the first touch is less than T2, the process branches from step 318 along the 'no' path to step 306 to await the next touch. The process loops from step 306 through step 318 until either the touch series is determined to be invalid or the elapsed time reaches T2.

Figure 11:
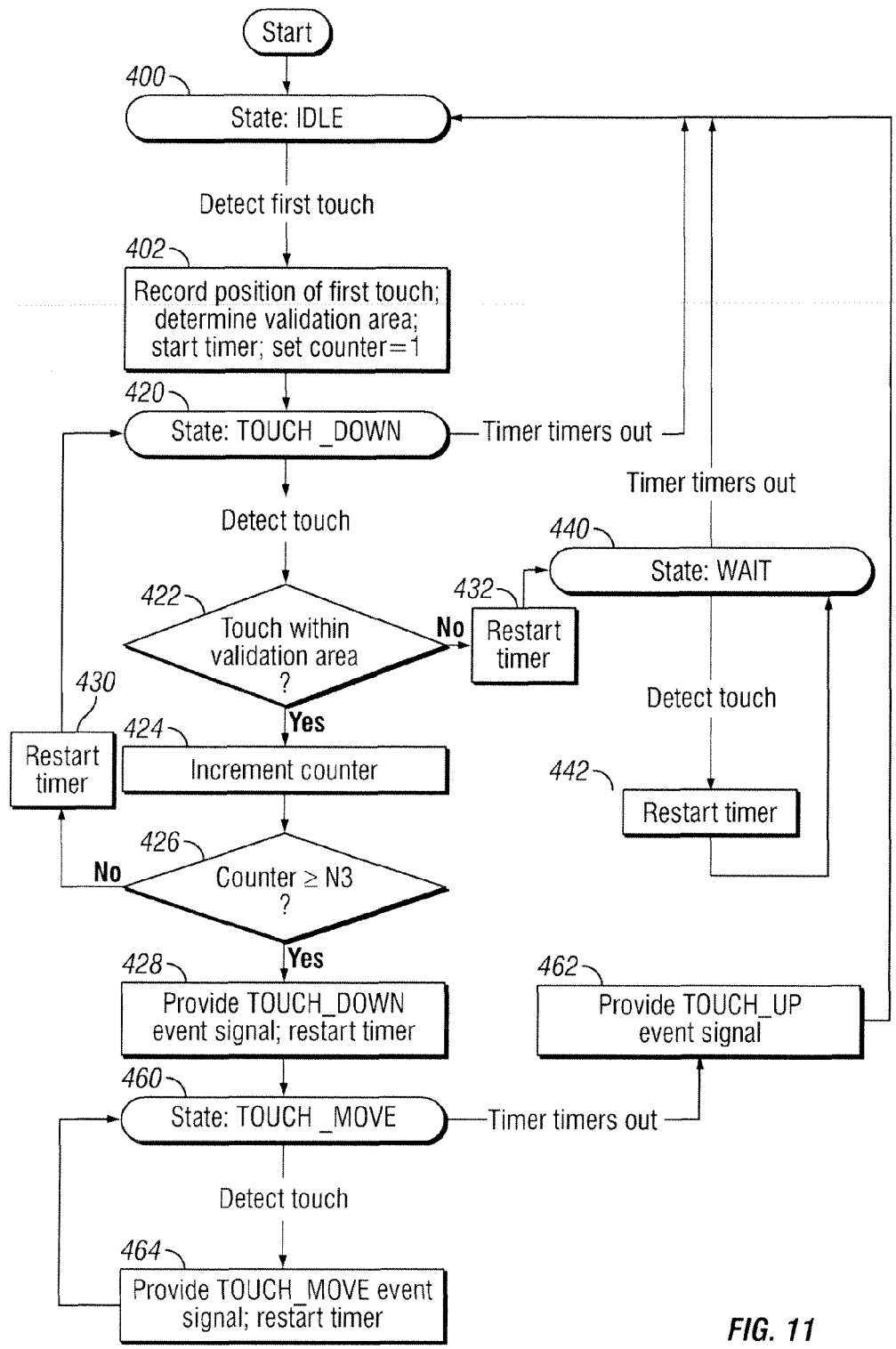
FIG. 11 is a state diagram depicting another embodiment of the disclosed touch screen filter according to certain aspects of this disclosure.

FIG. 11 is a state diagram depicting another embodiment of the disclosed touch screen filter according to certain aspects of this disclosure. The system starts in the idle state 400. The system remains in idle state 400 until a first touch is detected, whereupon the system transitions to block 402 and executes the actions of recording the position of the touch, determining the validation area, starting a timer, and setting a counter to a value of 1. The system then transitions to touch-down state 420.

In touch-down state 420, the system waits until either the timer times out or a new touch is detected. If the timer times out, the system returns from touch-down state 420 back to the idle state 400. If the system detects a touch while in state 420, the system determines in block 422 whether the touch is within the validation area. If in block 422 the touch is within the validation area, the system transitions along the 'yes' path to block 424, increments the counter, and then transitions to block 426 and determines whether the counter is greater than or equal to a determined number, for example N3. If in block 426 the counter has reached the value N3, the system transitions to block 428, providing a touch-down event signal and restarting the timer, then transitions to touch-move state 460. If the counter is less than N3, the system then transitions to block 430, restarting the timer, and returns to touch-down state 420. If in block 422 the touch was not within the validation area, the system follows the 'no' path to block 432, therein restarting the timer, and then transitions to the wait state 440.

In the touch-move state 460, the timer is running and the system is awaiting detection of a new touch. If a touch is detected before the timer times out, the system transitions to block 464, providing a touch-move event signal and restarting the timer, then returning back to touch-move state 460. If the system detects that the timer has timed out before a touch is detected, the system transitions to block 462, providing a touch-up event signal, and then transitions back to the idle state 400 to await a new first touch.

While in wait state 440, the system restarts the timer in block 442 if a touch is detected before the timer times out and then returns to wait state 440. If the timer times out before a touch is detected, the system transitions from wait state 440 to the idle state 400 and awaits a new first touch.

The systems and methods disclosed herein filter the touches detected by a touch screen so as to reduce the number of unintended touch-down and touch-release events received by the processor. This filtering may reduce the number of erroneous entries and actions initiated by a user pressing soft keys or other features of a touch screen input device. In certain embodiments, the disclosed system will reject a series of touches that are distributed over a larger distance than defined as acceptable. In certain embodiments, the disclosed system will reject a series of touches wherein the touch was not detected for a defined interval.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

Methods disclosed herein can be implemented in a non-transitory computer-readable medium having computer-executable instructions stored thereon for execution by a processor to perform the disclosed method. Non-transitory computer-readable medium includes any physical device or material capable of storing data in a non-transient machine-readable format that can be accessed by an automated sensing device including Random Access Memory (RAM), Read Only Memory (ROM), Programmable ROM (PROM), Erasable PROM (EPROM), rotating magnetic hard disks, solid-state memory (SSD), flash memory data storage devices including "thumb drives" and flash cards such as Secure Digital (SD) cards and Memory Sticks, optical disks including Compact Disks (CDs) and Digital Video Disks (DVDs), magnetic stripes, removable magnetic media such as Zip and Jaz drives, magnetic tape, magnetically or optically scannable images including Magnetic Ink Character Recognition (MICR) characters, barcodes and two-dimensional matrix codes, or any other suitable storage device.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims.

Reference to an element in the singular is not intended to mean "one and only one" unless specifically so stated, but rather "one or more." Unless specifically stated otherwise, the term "some" refers to one or more.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A method of filtering a touch screen input, the method comprising the steps of:
    detecting a position of a first center of contact of a finger impression on a touch screen;
    detecting a position for each of one or more second centers of contact of the finger impression on the touch screen; and
    providing a touch event signal if the positions of all of the second centers of contact of the finger impression are within a common validation area.

2. The method of claim 1, further comprising the step of determining that the touch screen input is invalid if the position of any of the second centers of contact are outside the validation area.

3. The method of claim 1, wherein the step of providing the touch event signal comprises providing the touch event signal if a total of first and second contacts of the finger impression are greater than or equal to a first determined number of contacts.

4. The method of claim 3, further comprising the step of determining that the touch screen input is invalid if an elapsed time since a last contact of the finger impression is greater than or equal to a first determined period of time and the total of the first and second contacts of the finger impression is less than the first determined number of contacts.

5. The method of claim 1, wherein the step of providing a touch event signal comprises providing the touch event signal if an elapsed time since a first contact of the finger impression is greater than or equal to a second determined period of time.

6. The method of claim 5, wherein a second contact of the finger impression is detected based on checking for a touch at a time interval equal to a third determined period of time since the last touch was detected.

7. The method of claim 6, further comprising the step of determining that the touch screen input is invalid if the second contact of the finger impression is not detected at the time interval equal to the third determined period of time since the last touch was detected and the elapsed time since the first contact of the finger impression is less than the second determined period of time.

8. The method of claim 1, wherein the step of detecting the position of the first center of contact of a finger impression comprises the steps of:
    detecting a first contact of the finger impression; and
    determining the position of the detected first contact of the finger impression.

9. The method of claim 1, wherein the step of detecting the position for each of one or more second centers of contact of the finger impression comprises the steps of:
    detecting the one or more second centers of contact of the finger impression; and
    determining, for each detected one or more second centers of contact of the finger impression, the position of the detected second center of contact of the finger impression.

10. A non-transitory computer-readable medium having computer-executable instructions stored thereon for execution by a processor to perform a method of filtering touch screen inputs, the method comprising the steps of:
    detecting a position of a first center of contact of a finger impression on a touch screen;
    detecting a position for each of one or more second centers of contact of the finger impression on the touch screen; and
    providing a touch event signal if the positions of all of the second centers of contact of the finger impression are within a common validation area.

11. The medium of claim 10, wherein the method further comprises the step of determining that the touch screen input is invalid if the position of any of the second centers of contact are outside the validation area.

12. The medium of claim 10, wherein the step of providing the touch event signal comprises providing the touch event signal if a total of first and second contacts of the finger impression are greater than or equal to a first determined number of contacts.

13. The medium of claim 12, wherein the method further comprises the step of determining that the touch screen input is invalid if an elapsed time since a last contact of the finger impression is greater than or equal to a first determined period of time and the total of the first and second contacts of the finger impression is less than the first determined number of contacts.

14. The medium of claim 1, wherein the step of providing a touch event signal comprises providing the touch event signal if an elapsed time since a first contact of the finger impression is greater than or equal to a second determined period of time.

15. The medium of claim 14, wherein a second contact of the finger impression is detected based on checking for a touch at a time interval equal to a third determined period of time since the last touch was detected.

16. The medium of claim 15, wherein the method further comprises the step of:
    determining that the touch screen input is invalid if the second contact of the finger impression is not detected at the time interval equal to the third determined period of time since the last touch was detected and the elapsed time since the first contact of the finger impression is less than the second determined period of time.

17. A method of filtering touch screen inputs, the method comprising the steps of:
    detecting one or more positions for one or more centers of contact of a finger impression on a touch screen, the one or more centers located within a fingerprint area of a finger impression; and
    providing a touch event signal if the positions of a determined number of most recent centers of contact of the finger impression are within a trigger area associated with the fingerprint area.

18. The method of claim 17, further comprising the step of:
    waiting for a next contact of a finger impression without providing the touch event signal if the position of any of the determined number of the most recent centers of contact is outside the trigger area.

19. The method of claim 18, further comprising the steps of:
    determining that the touch screen input is invalid if an elapsed time since a last contact of a finger impression was detected is greater than or equal to a first determined period of time.

20. The method of claim 18, further comprising the steps of:

determining a position of the next contact of the finger impression; and providing the touch event signal if the positions of all of the determined number of most recent centers of contact are within the trigger area.

21. The method of claim 20, further comprising the steps of:

determining that the touch screen input is invalid if an elapsed time since a first contact of the finger impression was detected is greater than or equal to a second determined period of time and the positions of any of the determined number of most recent centers are not within the trigger area.

22. A non-transitory computer-readable medium having computer-executable instructions stored thereon for execution by a processor to perform a method of filtering touch screen inputs, the method comprising the steps of:

detecting one or more positions for one or more centers of contact of a finger impression on a touch screen, the one or more centers located within a fingerprint area of a finger impression; and providing a touch event signal if the positions of a determined number of most recent centers of contact of the finger impression are within a trigger area associated with the fingerprint area.

23. The medium of claim 22, wherein the method further comprises the step of:

waiting for a next contact of a finger impression without providing the touch event signal if the position of any of the determined number of the most recent centers of contact is outside the trigger area.

24. The medium of claim 22, wherein the method further comprises the step of:

determining that the touch screen input is invalid if an elapsed time since a last contact of a finger impression was detected is greater than or equal to a first determined period of time.

25. The medium of claim 22, wherein the method further comprises the steps of:

determining a position of the next contact of the finger impression; and providing the touch event signal if the positions of all of the determined number of most recent centers of contact are within the trigger area.

26. The medium of claim 22, wherein the method further comprises the step of:

determining that the touch screen input is invalid if an elapsed time since a first contact of the finger impression was detected is greater than or equal to a second determined period of time and the positions of any of the determined number of most recent centers are not within the trigger area.

27. A method of filtering touch screen inputs, the method comprising the steps of:

starting a count-down timer with a determined period of count-down time and setting a counter to 1 and determining a validation area upon detection of a first contact of a finger impression on a touch screen;

incrementing the counter upon determining that a position of another contact of the finger impression on the touch screen detected before the timer times out is within the validation area; and providing a touch-down event signal if the counter is greater than or equal to a determined number.

28. The method of claim 27, further comprising the steps of:

restarting the timer upon provision of the touch-down signal;

providing a touch-move event signal upon detection of another contact of the finger impression on the touch screen before the timer times out and after provision of the touch-down signal; and providing a touch-up event signal if the timer times out before another contact of the finger impression on the touch screen is detected after provision of the touch-down signal.

29. The method of claim 27, further comprising the step of:

restarting the timer if the counter is less than the determined number after being incremented.

30. The method of claim 27, further comprising the steps of:

restarting the timer without incrementing the counter if the counter is less than the determined number and the position of the detected contact of the finger impression on the touch screen is outside of the validation area;

restarting the timer without incrementing the counter upon detection of another contact of the finger impression on the touch screen before the timer times out once a contact of the finger impression on the touch screen has been detected outside of the validation area; and waiting for a new first touch if the timer times out before another contact of the finger impression on the touch screen is detected once a touch has been detected outside of the validation area.

31. A non-transitory computer-readable medium having computer-executable instructions stored thereon for execution by a processor to filter touch screen inputs, the filtering comprising the steps of:

starting a count-down timer with a determined period of count-down time and setting a counter to 1 and determining a validation area upon detection of a first contact of a finger impression on a touch screen;

incrementing the counter upon determining that a position of another contact of the finger impression on the touch screen detected before the timer times out is within the validation area; and providing a touch-down event signal if the counter is greater than or equal to a determined number.

32. The medium of claim 31, wherein the filtering further comprises the steps of:

restarting the timer upon provision of the touch-down signal;

providing a touch-move event signal upon detection of another contact of the finger impression on the touch screen before the timer times out and after provision of the touch-down signal; and providing a touch-up event signal if the timer times out before another contact of the finger impression on the touch screen is detected after provision of the touch-down signal.

33. The medium of claim 31, wherein the filtering further comprises the step of:

restarting the timer if the counter is less than the determined number after being incremented.

34. The medium of claim 31, wherein the filtering further comprises the steps of:

restarting the timer without incrementing the counter if the counter is less than the determined number and the position of the detected contact of the finger impression on the touch screen is outside of the validation area;

restarting the timer without incrementing the counter upon detection of another contact of the finger impression on the touch screen before the timer times out once a contact of the finger impression on the touch screen has been detected outside of the validation area; and waiting for a new first touch if the timer times out before another contact of the finger impression on the touch screen is detected once a touch has been detected outside of the validation area.

35. A medical device comprising:

a touch screen configured to sense a touch;

a processor configured to accept a touch event signal; and a touch screen controller coupled to the touch screen and the processor, the controller configured to:

detecting a position of a first center of contact of a finger impression on a touch screen;

detecting a position for each of one or more second centers of contact of the finger impression on the touch screen; and providing a touch event signal if the positions of all of the second centers of contact of the finger impression are within a common validation area.

36. A medical device comprising:

a touch screen configured to sense a touch;

a processor configured to accept a touch event signal; and a touch screen controller coupled to the touch screen and the processor, the controller configured to:

detecting one or more positions for one or more centers of contact of a finger impression on a touch screen, the one or more centers located within a fingerprint area of a finger impression; and providing a touch event signal if the positions of a determined number of most recent centers of contact of the finger impression are within a trigger area associated with the fingerprint area.

37. A medical device comprising:

a touch screen configured to sense a touch;

a processor configured to accept a touch event signal; and a touch screen controller coupled to the touch screen and the processor, the controller configured to:

start a count-down timer with a determined period of count-down time and setting a counter to 1 and determining a validation area upon detection of a first contact of a finger impression on a touch screen;

increment the counter upon determining that a position of another contact of the finger impression on the touch screen detected before the timer times out is within the validation area; and provide a touch-down event signal if the counter is greater than or equal to a determined number.

\* \* \* \* \*